Jan. 10, 1961 A. A. DUBBELMAN 2,967,982

SWITCH-CONTROL CIRCUIT ARRANGEMENT OPERATING BY MEANS OF A PHASE-SENSITIVE DETECTOR

Filed July 19, 1957

INVENTOR
ADRIAAN ADAM DUBBELMAN
BY
Frank R. Jerifari
AGENT

United States Patent Office 2,967,982

Patented Jan. 10, 1961

2,967,982

SWITCH-CONTROL CIRCUIT ARRANGEMENT OPERATING BY MEANS OF A PHASE-SENSITIVE DETECTOR

Adriaan Adam Dubbelman, Bellevue, Johannesburg, Union of South Africa, assignor to North American Philips Company, Inc., New York, N.Y., a corporation of Delaware Filed July 19, 1957, Ser. No. 672,915

Claims priority, application Netherlands Sept. 7, 1956

8 Claims. (Cl. 317—148.5)

The invention relates to a circuit arrangement for the control of a switch, for example a relay, in accordance with a signal oscillation, this arrangement comprising a phase-sensitive detector to which the signal oscillation and a reference oscillation of the same frequency are supplied. Such arrangements are known. They may be used, for example, in devices for regulating the temperature inside a thermostat, or in other similar regulating or control devices. If the variable to be regulated, for example, the temperature varies slowly, this arrangement and most other arrangements give rise to difficulties, since, when the critical value of the variable at which switching must take place is reached, the switch or the relay tends to "hesitate." This hesitation is due to a rather slow increase or decrease of the current passing through the energizing winding of the switch or relay, which winding is usually included in the output circuit of the arrangement and constitutes, for example, the load impedance of the phase-sensitive detector. Consequently, the driving force for opening or closing the switch- or relay-contacts also increases only slowly and the resultant hesitation may comparatively soon damage the switch- or relay-contacts owing to arcing. This is in particular likely to occur if the contacts have to make or break a circuit conveying a high current.

The invention has for its object to avoid these difficulties. The circuit arrangement according to the invention has the feature that a positive feed-back for the signal oscillations is provided between the output circuit of the phase-sensitive detector and the input circuit of a preceding amplifying stage. When the signal voltage approaches a prescribed value with a determined polarity, owing to the feed-back, the current thus produced in the detector output circuit increases to such a high value that clean change-over of the switch is ensured when the prescribed value is attained.

The invention will be described more fully with reference to the drawing, in which—

Figure 1:
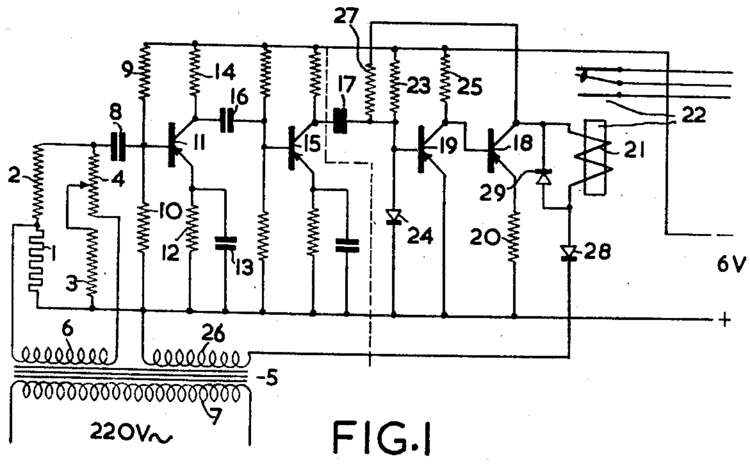
Fig. 1 shows the circuit diagram of a control-device, which comprises one embodiment of the arrangement according to the invention.

The control-device shown in Fig. 1 comprises a temperature-sensitive resistor 1, which constitutes the sensitive element of the device and which may be housed for example in a thermostat, the temperature of which is to be controlled. This resistor may for example be a so-called NTC-resistor and forms part of a Wheatstone bridge comprising two further resistors 2 and 3 and a potentiometer 4. This Wheatstone bridge is fed by means of a transformer 5, of which a secondary winding 6 is connected to the junction of the resistors 1 and 2 and to the end of the potentiometer 4 remote from the resistor 2, whereas the primary winding 7 is directly connected to the mains voltage. The two other diagonal points of the bridge, i.e. the junctions of the resistors 1 and 3 and of the resistor 2 with the potentiometer 4 are connected to the input terminal of a transistor amplifier. This amplifier comprises two transistor stages in grounded emitter connection. The transistors are fed from a direct-voltage source of, for example 6 v., for instance from a rectifier with a filter network. The base of the first transistor 11 is connected to the junction of the resistor 2 and of the potentiometer 4 via a capacitor 8 and is biased by means of a voltage divider consisting of two resistors 9 and 10 connected in series with one another between the terminals of the voltage source. The emitter circuit of the transistor 11 includes a stabilizing resistor 12 shunted by a capacitor 13, and a load resistor 14 is connected between its collector and the negative terminal of the voltage source. By way of the shunted resistor 12, the emitter of the transistor 11 is connected to earth and to the junction of the resistors 1 and 3 of the bridge. The second stage of the amplifier is similar to its first stage. The base of its transistor 15 is connected to the collector of the transistor 11 by way of a coupling capacitor 16, and the collector of the transistor 15 is coupled to the input of the arrangement according to the invention.

The arrangement for controlling the regulator switch of the device comprises a phase-sensitive detector and a preceding amplifying stage. The detector consists of a transistor 18 in grounded emitter connection and the amplifying stage includes a transistor 19 also in grounded emitter connection.

The base of the transistor 18 is directly connected to the collector of the transistor 19, its emitter circuit includes a stabilizing resistor 20 and its collector circuit includes a load impedance constituted by the energizing winding 21 of a relay 22. The base of the transistor 19 is biased by means of a voltage-divider consisting of a resistor 23 and a rectifier 24 connected in series between the terminals of the direct-voltage source. Its emitter is directly connected to earth and its collector is fed from the direct-voltage source via a load resistor 25. The collector of the detector transistor 18 is fed by a reference-voltage source formed by a second secondary winding 26 of the transformer 5.

If, for example owing to a temperature variation the bridge 1—4 is out of equilibrium, part of the alternating voltage supplied by the secondary winding 6 is fed to the input of the amplifier and, via this amplifier, applied to the input of the detector transistor 18.

If a negative signal voltage is applied to the base of the transistor 18 and if a negative voltage is at the same time applied to its collector via the winding 21, the transistor 18 becomes conductive and a current will flow from earth via the resistor 20 and the emitter-collector electrode path of this transistor through the winding 21 and back to the winding 26 of the transformer 5. The relay 22 is thus energized and changes over. If, for example, the signal oscillation is produced by an increase of the temperature inside a thermostat in which the resistor 1 is housed, a current for heating up this thermostat can be interrupted by means of the relay 22. If the bridge is out of equilibrium in the opposite direction, for example, owing to a decrease of the temperature of the resistor 1, the phase of the signal oscillation applied to the base of the transistor 18 is opposite to that of the reference oscillation applied to the collector of this transistor. Therefore, the transistor cannot become conductive, since it is cut off by a positive voltage applied to its base as long as its collector is negatively biased by the reference oscillation. The detector is therefore sensitive to the phase and the relay 22 is not energized as a consequence of a decrease of the temperature of the resistor 1.

With a slow decrease or increase of temperature and hence of the pulsatory current through the winding 21, it may occur that the relay 22 hesitates and changes over very slowly. If its contacts serve to complete or interrupt a circuit for a high current for heating up the thermostat this hesitation may soon lead to damage of the contacts. In order to prevent this hesitation and to ensure a clean change-over, a positive feed-back of the signal oscillation is employed, in accordance with the invention, between the output circuit of the transistor 18 and the input circuit of the preceding amplifying stage comprising the transistor 19. This feed-back is obtained by means of a connection between the collector of the transistor 18 and the base of the transistor 19, via a series resistor 27. Broadly speaking, when the signal voltage approaches a prescribed value and assumes a given polarity, this feed-back produces an increase of the resultant current across the detector output circuit to such a high value, that a clean change-over of the switch at the prescribed value of the signal voltage is secured. Any hesitation of the relay 22 is thus avoided.

Figure 2:
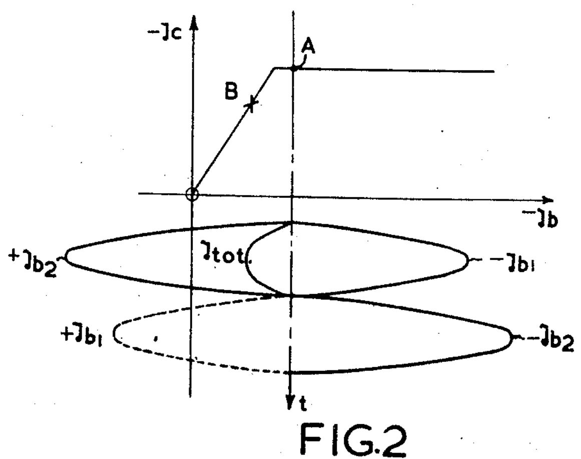
Fig. 2 shows a graph to explain the operation of this embodiment.

In order to secure a satisfactory operation of the arrangement, the signal oscillations are first amplified materially in the amplifier comprising the transistors 11 and 15, and the transistor 19 is adjusted in a manner such that it is normally substantially saturated, i.e. in the absence of signal oscillations. Its working point is then, for example, point A of the characteristic collector current $-I_c$ as a function of the base current $-I_b$, indicated in Fig. 2. Three different currents are supplied to its base electrode:

(1) An adjusting current of, for example, 120/$\mu$a. from the negative terminal of the direct-voltage source via the resistor 23;

(2) A current $I_{b1}$, produced by the reference voltage reaching the base electrode via the winding 21 and the resistor 27, and which is attenuated by this resistor and by the input impedance of the amplifying stage including the transistor 19;

(3) An eventual signal current $I_{b2}$, supplied via the coupling capacitor 17.

The positive half waves of the reference oscillation applied to the collector of the transistor 18 cannot cause this transistor to conduct, so that they may be neglected. A positive half wave of the current $I_{b1}$ is therefore shown in Fig. 2 by a broken line. The negative half waves of the reference oscillation produce a current $I_{b1}$, which only drives the transistor 19 further in the direction of saturation. When the transistor 19 is saturated, the base of the transistor 18 is substantially at earth potential, so that this transistor remains cut-off, even if its collector is negatively biased by the reference oscillation. In order to render the detector including the transistor 18 conductive, it is therefore necessary that the current $I_{b2}$, supplied via the coupling capacitor 17, should exceed the current $I_{b1}$ and that these currents should have opposite phases. If this is the case, the base current of the transistor 19 varies in accordance with the curve $I_{tot.}$ of the graph shown in Fig. 2, the working point of this transistor shifting towards the point B. Owing to this shift, the potential of the base electrode of the transistor 18 decreases and this transistor is rendered conductive, while at the same instant the reference voltage applied to its collector electrode is negative. Owing to the current then produced across the load impedance 21, the negative-going voltage applied to the collector of the transistor 18 and to the base of the transistor 19 decreases, so that the current passing through this transistor further decreases and the negative polarity of the base of the transistor 18 further increases and so on. As soon as the transistor 19 is driven out of its saturation condition, the current passing through the load impedance 21 increases to a saturation value. Consequently, this current consists of substantially rectangular pulses of a width which varies slightly with the amplitude of the signal oscillation.

In order to avoid rectification of the reference oscillation in the collector-base circuit of the transistor 18, a rectifier 28 is included in series with the load 21 in the collector-circuit of this transistor. This rectifier is connected in the cut-off direction with respect to the base-collector leakage current of the transistor 18. It also ensures that the positive half-waves of the reference oscillation, indicated in broken lines in Fig. 2, cannot reach the base electrode of the transistor 18.

The load impedance constituted by the relay winding 21 is strongly inductive, so that the periodic, abrupt interruption of the current passing through this winding can produce oscillations therein. Under certain conditions, such oscillations may cause rattling of the relay 22. They are therefore damped or suppressed by means of a rectifier 29 shunting the winding 21 and connected in the cut-off direction with respect to the detected current.

As stated above, one of the branches of the voltage-divider provided for biasing the base of the transistor 19 is constituted by a rectifier 24. This rectifier is connected in the opposite direction with respect to the emitter-base circuit of the transistor 19, so that a rectification of the signal oscillation in the input circuit of the amplifying stage including the transistor 19 is prevented.

Figure 3:
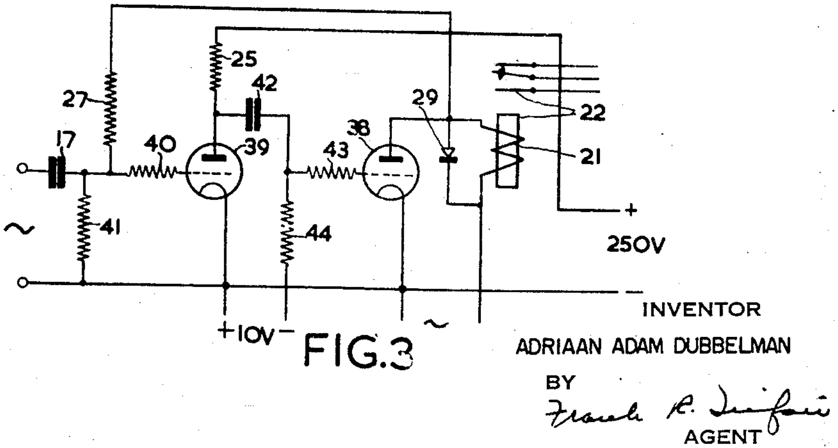
Fig. 3 shows a modification of the embodiment shown in Fig. 1.

In the modification shown in Fig. 3 the transistors 19 and 18 are replaced by tubes 39 and 38 respectively, for example triodes the cathodes of which are directly connected to earth. By way of the load impedance 25, the anode of the triode 39 is connected to the positive terminal of a direct-voltage source of, for example, 250 v., the negative terminal of this source being connected to earth. The grid of this triode is connected to earth via the resistors 40 and 41 and the values of these resistors and of the load resistor 25 are chosen to be such that a positive control-voltage applied to the grid of the triode 39 cannot produce a further increase of its anode current. The junction of the series-connected resistance 40 and 41 is connected to the coupling capacitor 17 and to the feed-back connection including the resistor 27. The other end of the feed-back connection is connected to the anode of the triode 38. The circuit of this anode includes the winding 21 shunted by the rectifier 29 and is connected to the secondary winding 26 of the transformer 5. The grid of the detector triode 38 is connected to the anode of the triode 39 via a coupling capacitor 42 and a resistor 43. The junction of the capacitor 42 and of the resistor 43 is connected via a resistor 44 to the negative terminal of a bias-voltage source of, for example, 10 v. This bias voltage is chosen such that the triode 38 is cut off in the absence of signal oscillations, and remains cut-off even during the positive half waves of the reference oscillation. The resistor 43 is provided for restricting the grid current of the triode 38 in the case of large control signals and the resistor 40 has the same function with respect to the triode 39.

The modification shown in Fig. 3 operates in the same manner as the circuit arrangement shown in Fig. 1. Signal oscillations are fed to the control grid of the triode 39 of the amplifying stage, via the capacitor 17 and the resistor 40. The positive half-wave of the signal oscillations can produce no further increase of the anode current of the triode 39 and no voltage variation across the resistor 25. The negative half-waves of the signal oscillations are however effective in reducing the anode current of the triode 39 and voltage drop across the resistor 25. The negative half-waves are therefore transmitted amplified and with reversed polarity to the control grid of the triode 38, via the capacitor 42 and the resistor 43.

The triode 38 is nomally cut-off, but is rendered conductive if the amplitude of the positive half-waves applied to its control grid exceeds the difference between the bias voltage of −10 volts and the characteristic grid cut-off voltage of said triode during the positive half-waves of the reference oscillations supplied to the anode of said triode via the relay winding 21. When this is the case, the anode current of the triode 38 produces a voltage drop across the winding 21, and this voltage drop counteracts the effect of the positive half-waves of the reference voltage fed to the control grid of the triode 39 via the feedback resistor 27 and the resistor 40.

When the amplitude of the negative half-waves set up across the winding 21 exceeds the amplitude of the positive half-waves of the reference oscillations, the working point of the triode is shifted towards cut-off, due to the feedback action. As a result of this shift, both the amplitude and duration of the positive half-waves set up across the resistor 25 and transmitted to the control grid of the triode 38 increase, and so forth; the action is cumulative and the pulsating current through the winding 21 promptly reaches its maximum value, as determined by the amplitude of the reference oscillations, the impedance of the winding 21 and the saturation characteristics of the triode 38.

As in the case of the embodiment of Fig. 1, a rectifier 29 is connected in parallel across the winding 21, in the reverse direction with respect to forward current through the anode circuit of the triode 38. This rectifier suppresses any oscillation set up in the winding 21 by shock-excitation, when the anode current of the triode 38 is suddenly interrupted. A rectifier, such as the rectifier 28 of Fig. 1, included in series in the load circuit, may be dispensed with, since rectification of the reference oscillation cannot take place in the anode-cathode circuit of the triode 38. Moreover, a rectifier such as the rectifier 24 of Fig. 1, connected between earth and the grid of the triode 39 may be omitted, inter alia due to the provision of the resistor 40.

With a practical embodiment of the arrangement described with reference to Fig. 1, the temperature inside a thermostat was regulated in a manner such that the temperature fluctuations were lower than 0.5° C. By varying the position of the tapping of the potentiometer 4, the control-temperature could be varied between −20° C. and +80° C., the relay employed changing over abruptly even with very slow temperature variations, the voltage at the terminals of the temperature-sensitive resistor 1 always remaining equal to 0.1 v. and thus very low.

As a matter of course, further amplifying stages may be connected between the amplifying stage including the transistor 19 or the tube 39 and the phase-sensitive detector, provided the signal oscillations at the output of this detector and at the input of the stage to which the feedback circuit is connected remain substantially in phase.

What is claimed is:

1. A circuit arrangement for actuating a switch under the control of signal oscillations of a given frequency, comprising an amplifier, a phase sensitive detector having an input circuit coupled to the output of said amplifier and an output circuit coupled to switch-actuating means, means for supplying said signal oscillations to the input of said amplifier, a source of reference oscillations of said given frequency, means for supplying said reference oscillations to the output circuit of said detector, and a direct current regenerative feedback path interconnecting the output circuit of said detector and the input circuit of said amplifier, whereby the direct current in the output circuit of said detector abruptly increases during determined half-cycles of said signal oscillations and said reference oscillations, and said switch actuating means is abruptly energized due to said abrupt increase.

2. A circuit arrangement according to claim 1 wherein said output circuit includes a load impedance connected to said feedback path and to an output electrode of said detector, the said source of reference oscillations being connected to the end of said load impedance remote from said output electrode and feedback path, whereby the difference between the voltage of said reference oscillations and the voltage drop across said load impedance is fed back to the input circuit of said amplifier.

3. A circuit arrangement according to claim 2, wherein said detector comprises a unidirectionally conducting path provided between said output electrode and a further electrode of said detector, whereby said path and said output circuit are cut off during determined half-waves of said reference oscillations.

4. A circuit arrangement according to claim 3, wherein the output of said amplifier is directly coupled to the input circuit of said detector, said amplifier being biased to saturation.

5. An arrangement as claimed in claim 3, wherein said detector comprises a transistor having base, emitter, and collector electrodes, said input circuit being connected between said base and emitter electrodes, said output circuit being connected to said collector electrode, and a rectifier connected in series with said output circuit, the polarity of said rectifier being in the forward direction with respect to the forward current flowing from said emitter electrode to said collector electrode.

6. A circuit arrangement for actuating a switch under the control of signal oscillations of a given frequency, comprising an amplifier, a phase sensitive detector having an input circuit coupled to the output of said amplifier and an output circuit coupled to switch-actuating means, means for supplying said signal oscillations to the input of said amplifier, a source of reference oscillations of said given frequency, means for supplying said reference oscillations to the output circuit of said detector, and a direct current regenerative feedback path interconnecting the output circuit of said detector and the input circuit of said amplifier, whereby the direct current in the output circuit of said detector abruptly increases during determined half-cycles of said signal oscillations and said reference oscillations, and said switch actuating means comprising an inductive load on said detector, and a rectifier connected in parallel with said load, the conducting path of said rectifier being in the reverse direction with respect to the direct current flowing in said output circuit by detection of said signal oscillations.

7. A circuit arrangement for actuating a switch under the control of signal oscillations of a given frequency, comprising an amplifier, a phase sensitive detector having an input circuit coupled to the output of said amplifier and an output circuit coupled to switch-actuating means, means for supplying said signal oscillations to the input of said amplifier, a source of reference oscillations of said given frequency, means for supplying said reference oscillations to the output circuit of said detector, and a direct current regenerative feedback path interconnecting the output circuit of said detector and the input circuit of said amplifier, whereby the direct current in the output circuit of said detector abruptly increases during determined half-cycles of said signal oscillations and said reference oscillations, and said switch actuating means is abruptly energized due to said abrupt increase, said amplifier comprising a transistor having base, emitter and collector electrodes, the output of said amplifier being connected to said collector electrode, the input circuit of said amplifier being connected between said base and emitter electrodes, said input circuit comprising a rectifier connected across said base-emitter path and in the opposite conducting direction to said base-emitter path.

8. A circuit arrangement for actuating a switch under the control of signal oscillations of a given frequency, comprising an amplifier, a phase-sensitive detector having at least two electrodes, means coupling one of said electrodes to the output of said amplifier, a source of reference oscillations of said given frequency, means for supplying said signal oscillations to the input of said amplifier, means for supplying said reference oscillations to another of said electrodes, switch actuating means, the output of said detector being coupled to said switch actuating means, and a direct current regenerative feedback path interconnecting the output of said detector and the input of said amplifier, whereby the direct current in the output circuit of said detector abruptly increases during determined half-cycles of said signal oscillations and said reference oscillations, and said switch actuating means is abruptly energized due to said abrupt increase.

References Cited in the file of this patent

UNITED STATES PATENTS

| | | |
|---|---|---|
| 2,689,339 | Hornfeck | Sept. 14, 1954 |
| 2,706,274 | Boyer | Apr. 12, 1955 |
| 2,825,012 | Consoliver | Feb. 25, 1958 |
| 2,830,265 | Ellison | Apr. 8, 1958 |
| 2,864,978 | Frank | Dec. 16, 1958 |